United States Patent
Cuffney et al.

(10) Patent No.: US 9,501,262 B2
(45) Date of Patent: *Nov. 22, 2016

(54) VECTORIZED GALOIS FIELD MULTIPLICATION

(71) Applicant: International Business Machines Corporation, Armonk, NY (US)

(72) Inventors: James R. Cuffney, Poughkeepsie, NY (US); John G. Rell, Jr., Saugerties, NY (US); Eric M. Schwarz, Gardiner, NY (US); Patrick M. West, Jr., Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

This patent is subject to a terminal disclaimer.

(21) Appl. No.: 14/291,942

(22) Filed: May 30, 2014

(65) Prior Publication Data

US 2015/0261504 A1    Sep. 17, 2015

Related U.S. Application Data

(63) Continuation of application No. 14/211,272, filed on Mar. 14, 2014.

(51) Int. Cl.
*G06F 7/72* (2006.01)

(52) U.S. Cl.
CPC ........... *G06F 7/724* (2013.01); *G06F 2207/72* (2013.01)

(58) Field of Classification Search
None
See application file for complete search history.

(56) References Cited

U.S. PATENT DOCUMENTS

2009/0077145 A1* 3/2009 Dobbelaere ........... G06F 7/5312
708/232

OTHER PUBLICATIONS

List of IBM Patents or Patent Applications Treated as Related; (U.S. Appl. No. 14/211,272); 1 page.

* cited by examiner

*Primary Examiner* — Michael D Yaary
(74) *Attorney, Agent, or Firm* — Cantor Colburn LLP; Margaret McNamara

(57) ABSTRACT

Embodiments relate to vectorized Galois field multiplication. An aspect includes an input of first and second input operands of equal sizes into a single hardware tree, a calculation of a predicted parity as a parity of the first input operand ANDed with a parity of the second input operand, a comparison of the predicted parity with a parity generated on a final result of a Galois field multiplication of the first and second operands and a raising of an error based on a mismatch between the predicted parity and the generated parity.

15 Claims, 17 Drawing Sheets

Figure 2
Doubleword Mode
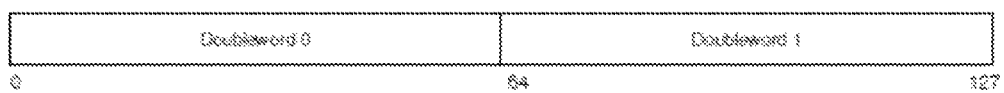
Word Mode
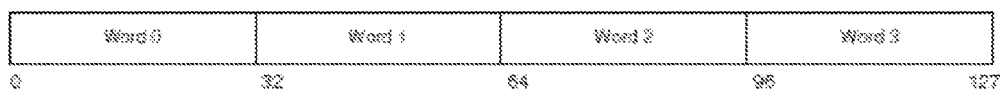
Halfword Mode
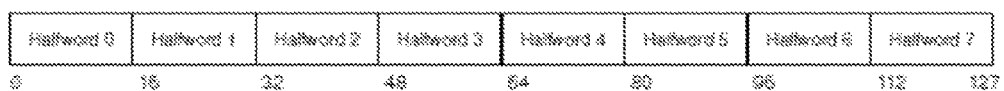
Byte Mode
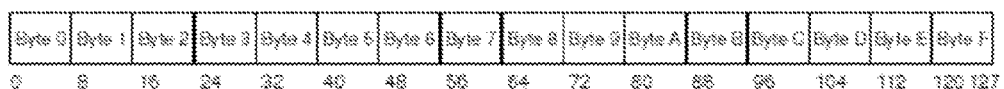

GF Multiply (64x64)

Figure 9

Byte Masks for Doubleword Mode

Figure 10

Byte Masks for Word Mode

Figure 11

Byte Masks for Halfword Mode

Figure 12

Byte Masks for Byte Mode

VECTORIZED GALOIS FIELD MULTIPLICATION

CROSS REFERENCE TO RELATED APPLICATION

This application is a continuation of U.S. application Ser. No. 14/211,272, which was filed on Mar. 14, 2014. The entire disclosures of U.S. application Ser. No. 14/211,272 is incorporated by reference herein.

BACKGROUND

The present invention relates generally to vectorized Galois field multiplication, and more specifically, to vectorized Galois field multiplication in which modified vector elements of a first input operand and vector elements of a second input operand are input into a single hardware tree configured for subdivision into staggered subtrees a size of each of which being based on the base mode size.

A Galois field multiplier performs a function that can be described as "carry-less multiplication." That is, the operation resembles multiplication, with a bit-wise AND of two input elements, but the partial products are not added. Instead, the columns are XORed, with no carries from column to column.

An exemplary Galois field multiplier was described in U.S. Patent Application 20100306293, which was filed on May 12, 2010, the entire contents of which are incorporated herein by reference. As disclosed in that application, a Galois field multiplier includes a multiplication circuit for inputting two m bits binary multiplicators and outputting their product, where m is an integral power of 2, and the output of the multiplication circuit includes a high bits portion output and a low bits portion output. The Galois field multiplier further includes a memory for storing a Galois field multiplication coefficient array calculated from a selected Galois field primitive polynomial, a first module for performing an operation on the output of the multiplication circuit and the Galois field multiplication coefficient array stored in said memory to obtain the product of the two m bits binary multiplicators over the Galois field. The Galois field multiplier has a small hardware footprint, short response latency and strong universality.

Another exemplary Galois field multiplier was described in U.S. Pat. No. 6,023,782, which was filed on Dec. 13, 1996, the entire contents of which are incorporated herein by reference. As disclosed in that application, a circuit performs a computation of a plurality of coefficients of an error locator polynomial and a plurality of coefficients of an error evaluator polynomial in a system for correcting errors in a Reed-Solomon encoded datastream. The circuit is coupled to a syndrome generator and receives syndromes and includes an arithmetic unit iteratively generating intermediate and final values of the plurality of coefficients of an error locator polynomial and the plurality of coefficients of an error evaluator polynomial, a random access memory storing the intermediate and final values of the plurality of coefficients of an error locator polynomial and the plurality of coefficients of an error evaluator polynomial and a control unit. The control unit controls the arithmetic unit and the memory and detects when the computation of the plurality of coefficients of an error locator polynomial and the plurality of coefficients of an error evaluator polynomial has been completed.

SUMMARY

Embodiments include a method, system, and computer program product for vectorized Galois field multiplication. First and second input operands of equal sizes are input into a single hardware tree, a predicted parity is calculated as a parity of the first input operand ANDed with a parity of the second input operand, the predicted parity is compared with a parity generated on a final result of a Galois field multiplication of the first and second operands and an error is raised based on a mismatch between the predicted parity and the generated parity.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 2 illustrates various Galois field multiplier modes in accordance with an embodiment;

FIG. 5 illustrates Galois field multiplier Halfword and Byte modes in accordance with an embodiment;

FIG. 6 is a schematic diagram of a hardware tree in accordance with an embodiment;

FIG. 9 shows Byte masks for a Doubleword Mode, which has 64-bit elements, in accordance with an embodiment;

FIG. 10 shows Byte masks for a Word Mode where each subtree receives 4 bytes from an operand A with 32 zeros in the remaining bits in accordance with an embodiment;

FIG. 11 shows Byte masks for a Halfword Mode where each subtree receives 2 bytes from an operand A with 48 zeros in the remaining bits in accordance with an embodiment;

FIG. 12 shows Byte Masks for a Byte mode where each subtree receives 1 byte from an operand A with 56 zeros in the remaining bits in accordance with an embodiment;

FIG. 13 illustrates how the tree design accommodates an element size of Doubleword mode in accordance with an embodiment;

FIG. 14 illustrates how the tree design accommodates an element size of Word mode in accordance with an embodiment;

FIG. 15 illustrates how the tree design accommodates an element size of Halfword mode in accordance with an embodiment;

FIG. 16 illustrates how the tree design accommodates an element size of Byte mode in accordance with an embodiment;

DETAILED DESCRIPTION

Vectorized Galois field multiplication is provided. An aspect includes an input of first and second input operands of equal sizes into a single hardware tree, a calculation of a predicted parity as a parity of the first input operand ANDed with a parity of the second input operand, a comparison of the predicted parity with a parity generated on a final result of a Galois field multiplication of the first and second operands and a raising of an error based on a mismatch between the predicted parity and the generated parity.

Figure 1:
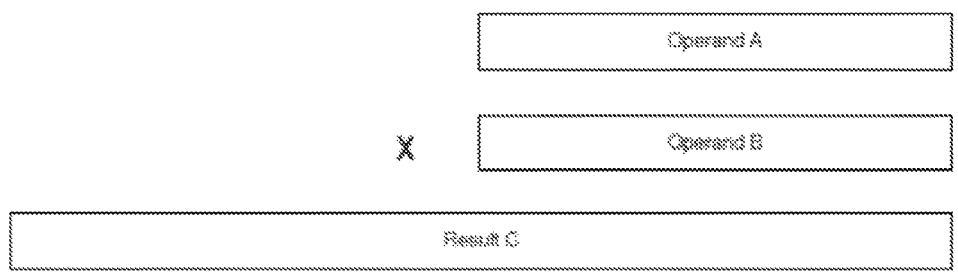
FIG. 1 depicts an operation on 2 input operands in accordance with an embodiment.

For binary systems, a Galois Field Multiplier performs a function that can be described as "carry-less multiplication." FIG. 1 depicts such an operation on 2 input operands, Operand A and Operand B, which produces a result, Result C. The result is twice as wide as the input operands. To illustrate the function by example, a simple scalar (as opposed to vector) 8×8 case is provided, with 2 Byte sized elements, x'45' and x'ED'. The operation resembles multiplication, with a bit-wise AND of the elements, but the partial products are not added. Instead the columns are XORed, with no carries from column to column as shown in Table 1 below in which there is an implied leading zero on the result. This bit will always be zero.

TABLE 1

| Operand A: 45 | 01000101 |
|---|---|
| Operand B: ED | 11101101 |
| | 01000101 |
| | 00000000 |
| | 01000101 |
| | 01000101 |
| | 00000000 |
| | 01000101 |
| | 01000101 |
| Result C | 01110000001101 |
| Hex | 3  8  1  9 |

A method of vectorizing a Galois field multiplier and a method for designing a vectorized Galois field multiplier that can operate in various modes utilizing the same are described below. For a Galois field multiplier with equal sized input operands having an even number of bits in each, the methods include subdividing the input operands into vector elements of equal sizes and defining multiple modes such that a base mode has the smallest element size with that element size being a factor of the operand size and a requirement that each higher mode has an element size that is a multiple of the base element size. In particular, a Galois field multiplier is provided that is capable of handling vector element sizes of 64 (Doubleword, DW), 32 (Word, W), 16 (Halfword, HW), and 8 (Byte, B) bits, with 128 bit operands and a byte mode being the base mode. However, this method applies to other cases with larger or smaller vectors and with fewer or greater modes of operation.

Figure 3:
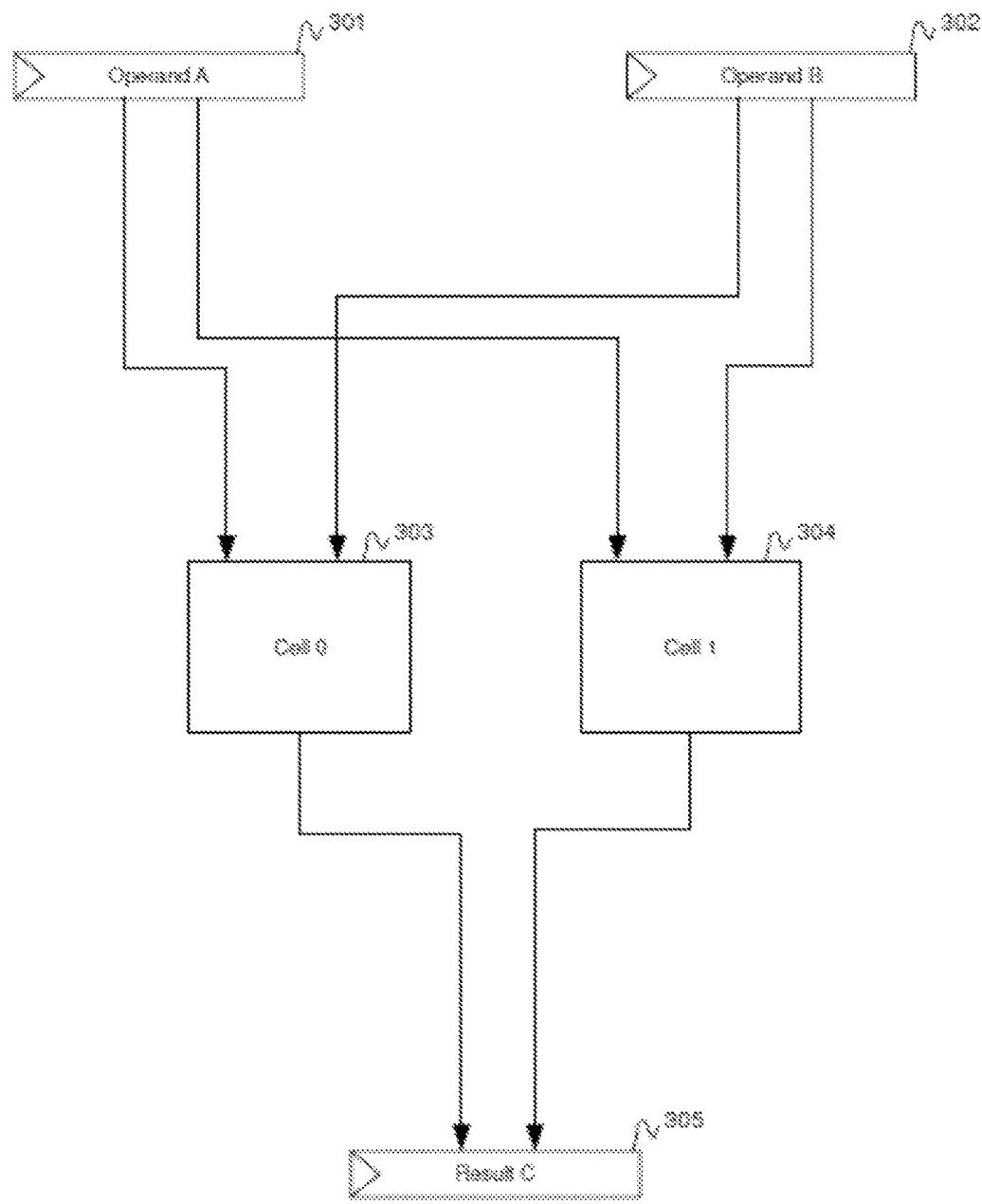
FIG. 3 is a schematic illustration of a cell structure to support a Galois field multiplier mode in accordance with an embodiment.

With reference to FIGS. 2 and 3, the modes and structures in a given case are illustrated. As shown in FIG. 2, since the largest element is Doubleword, the design allows for two identical instances of 64-bit hardware (i.e., cells) each producing 128 bit results. As shown in FIG. 3, the high 64 bits of each operand, Operand A 301 and Operand B 302, are routed to Cell 0 303 and the low 64 bits of each operand are routed to Cell 1 304. The results from each cell 303 and 304 are concatenated to form Result C 305. Both cells 303 and 304 are capable of operating in each of the above-noted modes.

Figure 4:
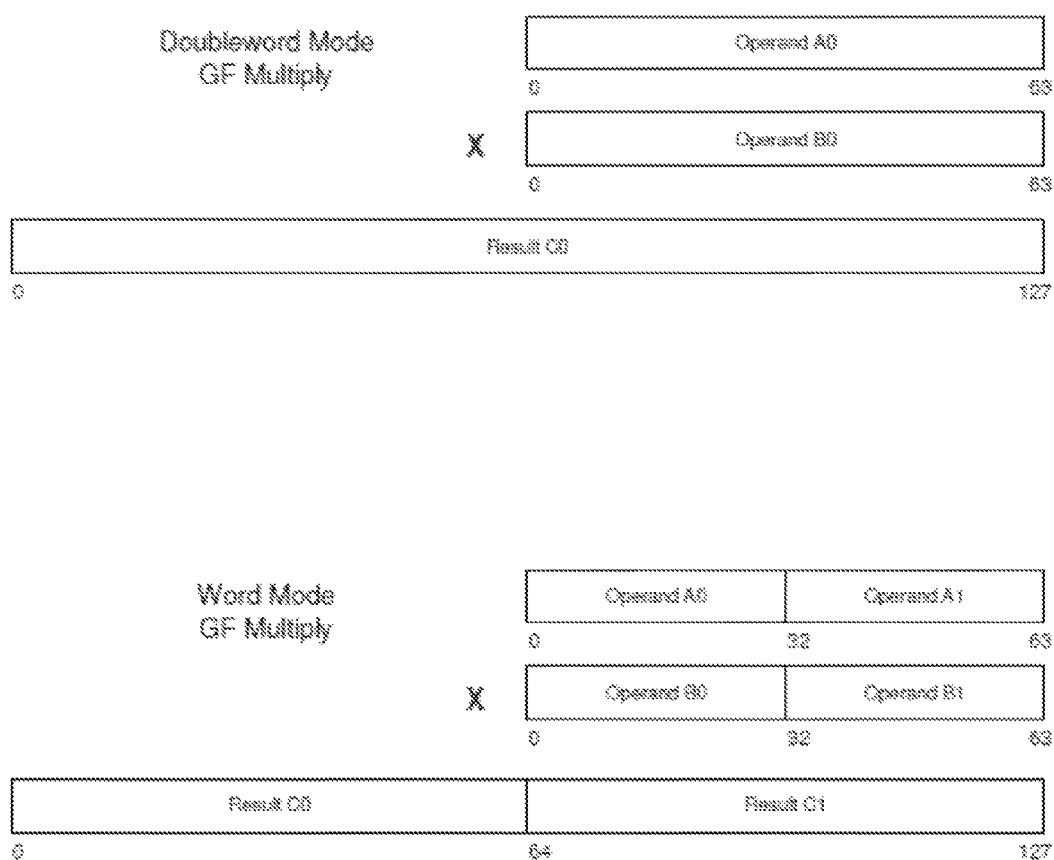
FIG. 4 illustrates Galois field multiplier Doubleword and Word modes in accordance with an embodiment.
Figure 5:
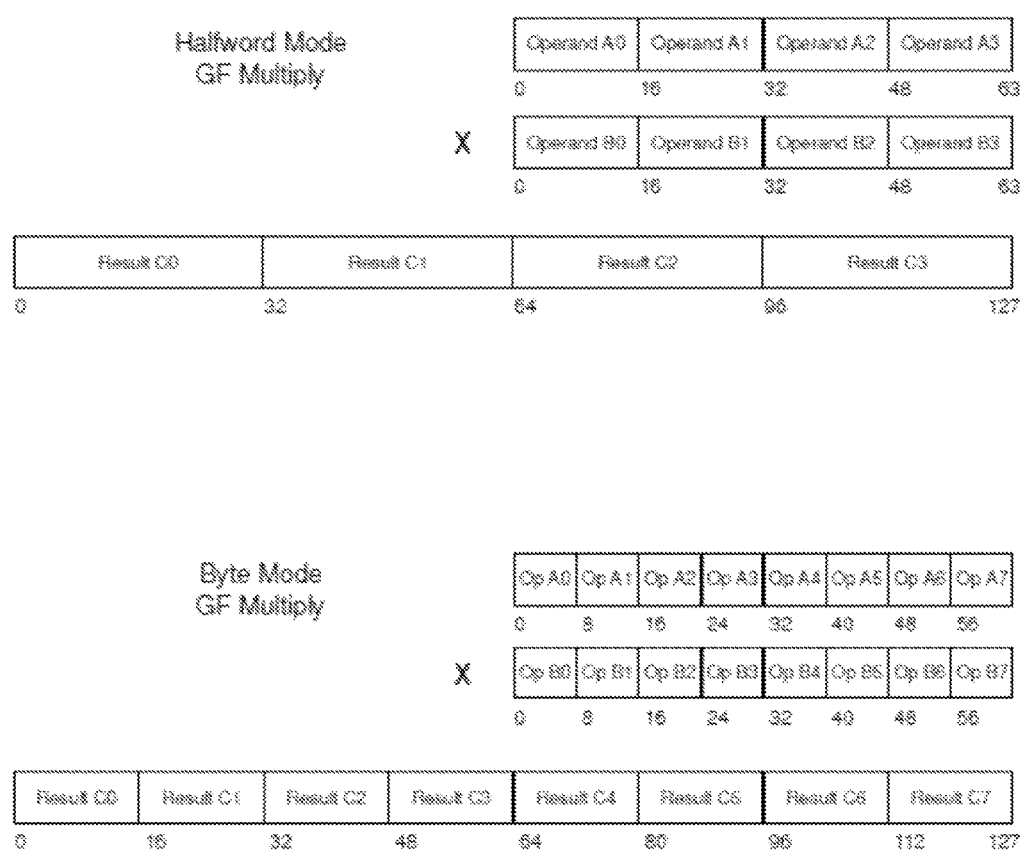

With reference to FIGS. 4 and 5, Doubleword mode and Word mode and Halfword mode and Byte mode are shown. In Doubleword mode, 64 bits of Operand A A0 are multiplied with 64 bits of Operand B B0 to produce a 128 bit result, Result C C0. In Word mode, 32 bits of Operand A A0 are multiplied with 32 bits of Operand B B0 to produce 64 bits of Result C C0. Another 32 bits of Operand A A1 are multiplied with another 32 bits of Operand B B1, to produce another 64 bits of Result C C1. These are independent operations with separate results. In Halfword mode, 16 bits of Operand A A0 are multiplied with 16 bits of Operand B B0 to produce 32 bits of Result C C0. Another 16 bits of Operand A A1 are multiplied with another 16 bits of Operand B B1 to produce another 32 bits of Result C C1. Likewise, A2 is multiplied with B2 to produce C2 and A3 is multiplied with B3 to produce C3. These are independent operations with separate results. Similarly, in Byte Mode, 8 bits of Operand A A0 are multiplied with 8 bits of Operand B B0 to produce 16 bits of Result C C0. Another 8 bits of Operand A A1 are multiplied with another 8 bits of Operand B B1 to produce another 16 bits of Result C C1. Likewise, A2 is multiplied with B2 to produce C2, A3 is multiplied with B3 to produce C3, A4 is multiplied with B4 to produce C4, A5 is multiplied with B5 to produce C5, A6 is multiplied with B6 to produce C6 and A7 is multiplied with B7 to produce C7. Again, these are independent operations with separate results.

To illustrate the difficulty in supporting vector modes, the description returns to the earlier, 8-bit example, but with 8-bit operands each including 2 4-bit vector elements, A0, A1, B0, and B1 that are treated as separate, independent operations as shown in Table 2 below.

TABLE 2

| Operand A: 45 A0-4 A1-5 | 0100 | 0101 |
|---|---|---|
| Operand B: ED B0-E B1-D | 1110 | 1101 |
| | 0000 | 0101 |
| | 0100 | 0000 |
| | 0100 | 0101 |
| | 0100 | 0101 |
| Result C | 00111000 | 00111001 |
| Hex | 3  8 | 3  9 |

Thus, simply concatenating the result bits will not produce the correct 8×8 result from the original example; x'3839'!=x'3819' and, while, one method to support both of these modes, 4×4 and 8×8, would be to build separate hardware for each operation, all modes can be supported on a single hardware tree structure.

Figure 6:
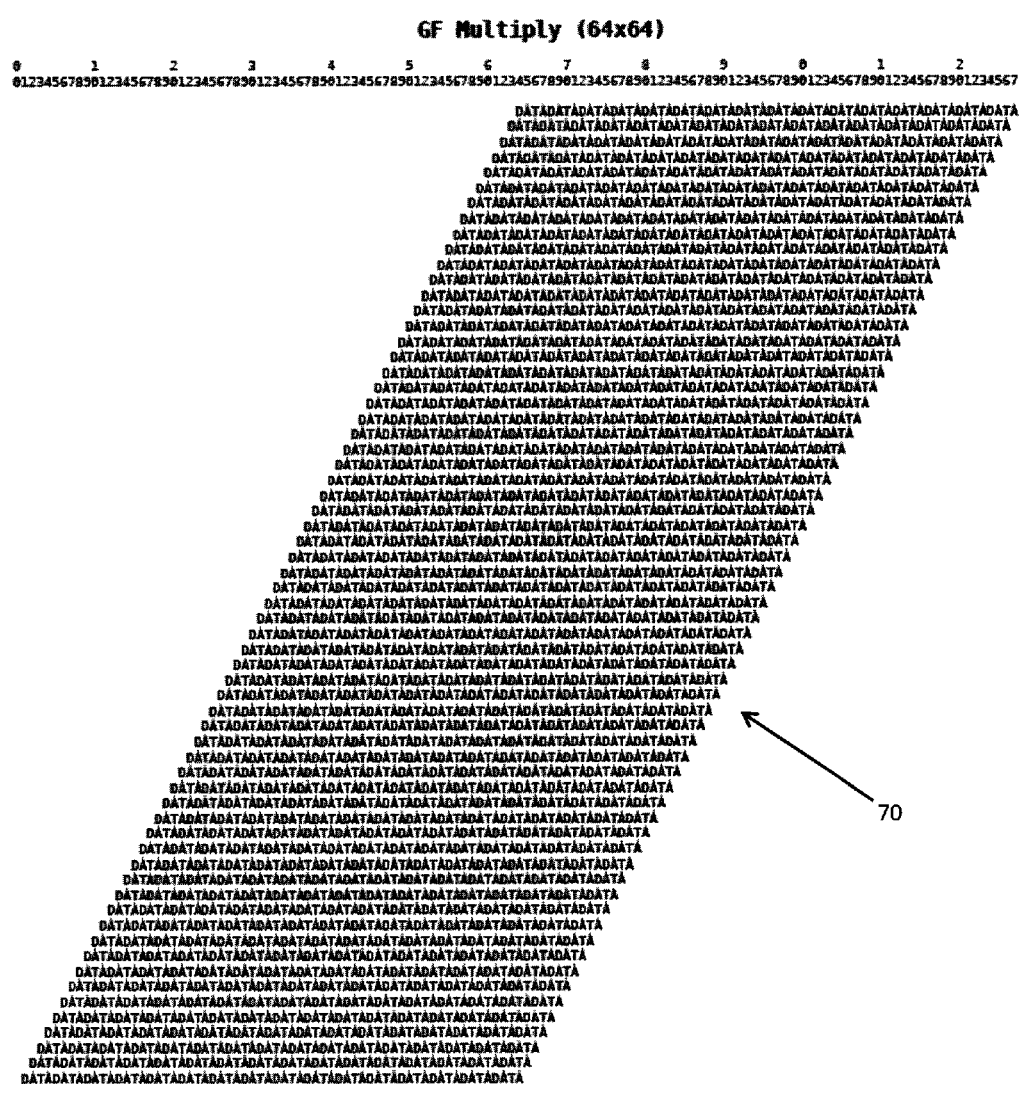
Figure 7:
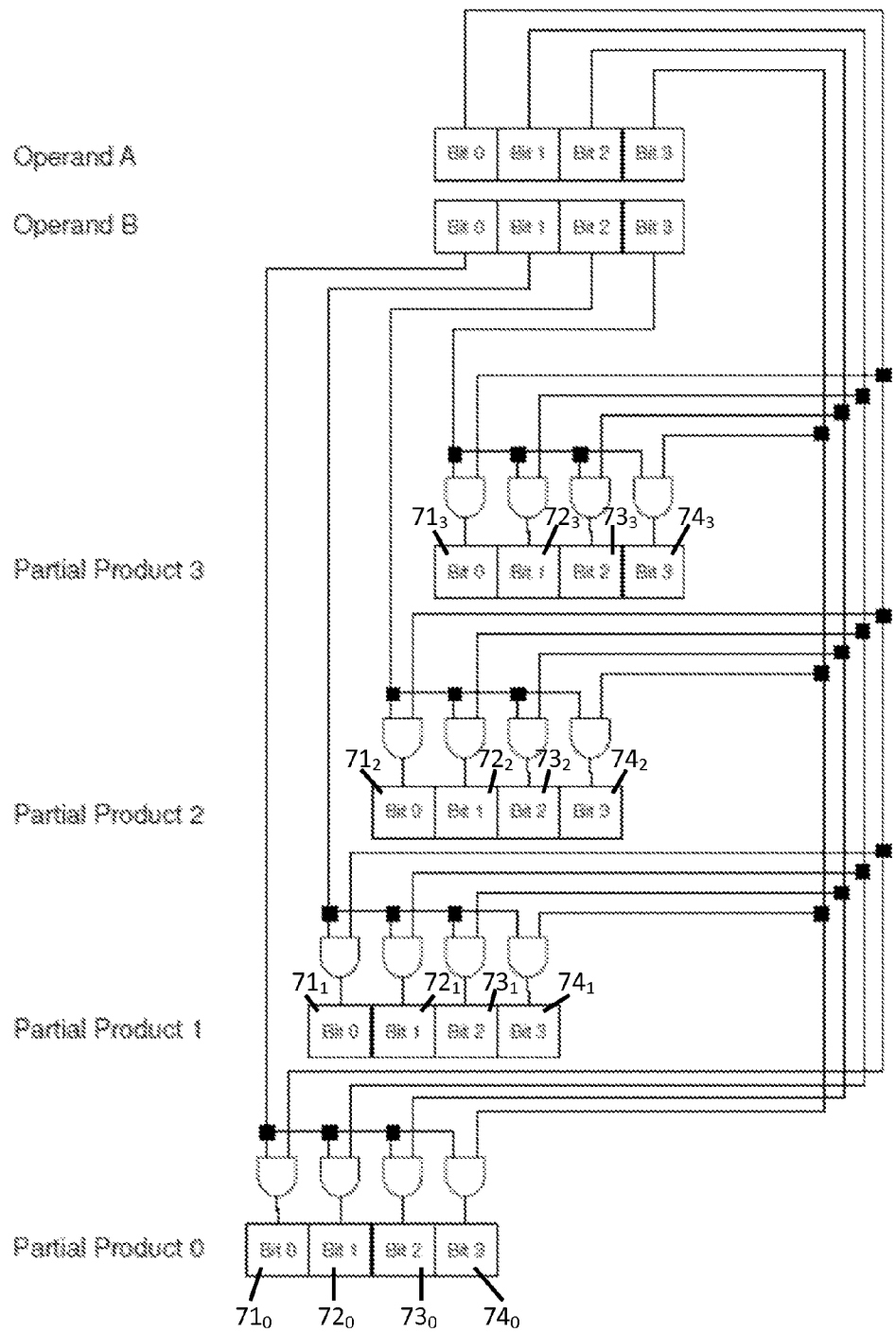
FIG. 7 is a schematic diagram of a hardware tree to create partial products in accordance with an embodiment.

With reference to FIGS. 6 and 7, hardware to create partial products for a 4×4 version of this function is provided. Simple 2-input AND gates are used in the implementation but larger versions of the function can be built using a similar structure. For a 64×64 version, 64 partial products are generated, each of which is 64 bits wide. As shown in FIG. 7, the hardware is a hardware tree 70 that is capable of compressing the 64 partial products from a 64×64 bit operation. In the case illustrated in FIG. 6, "DATA" denotes bits of the partial products and their physical alignment with one another and with the illustrated configuration, performance of the operation in hardware includes the bits in each column being XORed together to produce a single bit of the result.

As shown in FIG. 7, hardware support for the hardware tree 70 includes first through fourth AND Gates $71_{0-3}$, $72_{0-3}$, $73_{0-3}$ and $74_{0-3}$ for each Partial Product 0-3. As an example, the Bit 0 element for Partial Product 0 is generated from first AND Gate $71_0$, which has an input provided from the Bit 0 element of operand B and the Bit 0 element of operand A, and the Bit 1 element for Partial Product 0 is generated from the second AND Gate $72_0$, which has an input provided from the Bit 0 element of operand B and the Bit 1 element of operand A. By contrast, the Bit 0 element for Partial Product 1 is generated from first AND Gate 71$_1$, which has an input provided from the Bit 1 element of operand B and the Bit 0 element of operand A, and the Bit 1 element for Partial Product 1 is generated from the second AND Gate 72$_1$, which has an input provided from the Bit 1 element of operand B and the Bit 1 element of operand A.

Figure 8:
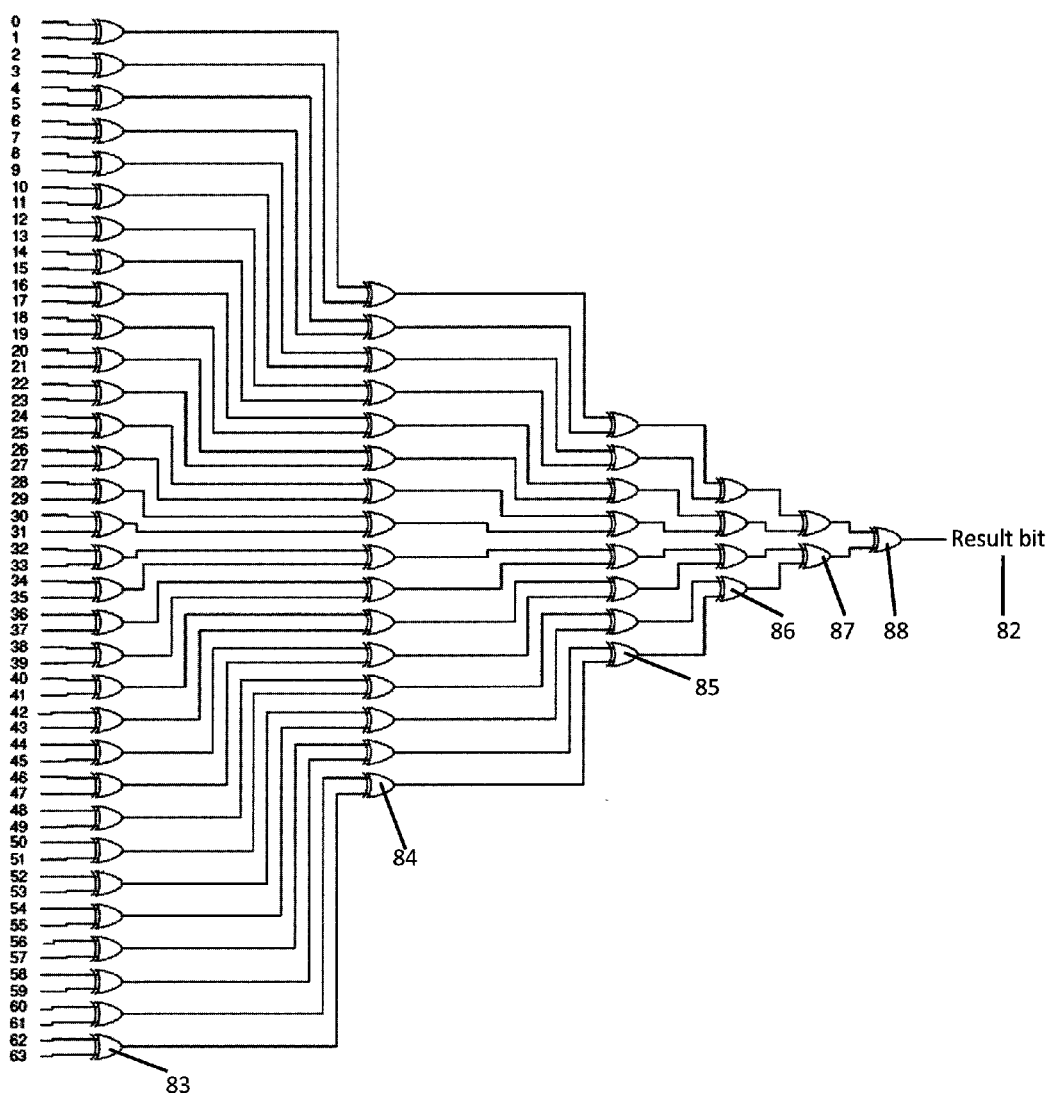
FIG. 8 illustrates 2 hardware examples in accordance with an embodiment.

With reference to FIG. 8, two examples of a hardware tree implementation behind each column in FIG. 6 is provided. Column 126, has two data bits to be combined, so a single 2-input XOR gate 80 is sufficient to produce the output bit 81 for that column. The column in FIG. 6 with the greatest number of data bits to be combined is column 64 and has 64 data bits in it. To produce the output bit 82 for column 64, 32, 2-input XOR gates 83 are formed and the outputs of these feed 16 2-input XOR gates 84, which, in turn, feed 8 more 2-input XOR gates 85. The outputs of these drive another 4 2-input XOR gates 86, which drive 2 more 2-input XOR gates 87. The outputs of these drive the final 2-input XOR gate 88 to produce the single bit output bit 82 for column 64.

The other columns have similar structures, ranging in complexity between the 2 illustrated extremes. Thus, the number of gates for each column is dictated by the number of data bits which need to be combined to produce the output bit. The right most column, column 127, has only a single data bit and requires no hardware with a single wire being sufficient. Likewise, column 1 needs only a single wire. Column 0 is the implied leading zero mentioned above.

The hardware tree of FIG. 6 will handle Doubleword mode, the 64×64 case. However, as previously demonstrated, it will not accommodate the other modes, Word mode, Halfword mode and Byte mode without modification. This modification, as explained herein with further reference to FIGS. 13-16), includes a subdivision of the hardware tree 70 into subtrees (see FIGS. 13-16) as dictated by a size of the Base mode. Each subtree includes a number of partial products equal to a size of the elements in the Base mode. An AND mask is then applied to the partial products in each subtree with a separate mask value for each subtree and the mask value for a given subtree being applied to each partial product within that subtree. The mask values are calculated in advance depending on the Mode of operation and the mask values are different for each mode.

To demonstrate, in an 8×8 example and where 2 4×4 operations are to be performed on the same hardware as shown in Table 3, input operands may be 8-bits long and the Base mode has vector elements 4-bits in length. Thus, the hardware tree is divided into subtrees that each includes 4 partial products. In 8×8 Mode, both subtrees will participate in the single 8×8 calculation. In 4×4 Mode, each subtree will perform an independent 4×4 operation. The mask values control the mode of operation. For the 8×8 mode, both masks are filled with ones, so all bits of the partial products in each subtree are preserved. For the 4×4 mode, the top subtree receives a mask value of b'00001111', so the most significant 4-bits of its partial products are forced to zeros (as denoted by the "." character in the figures). Similarly, the bottom subtree receives a mask value of b'11110000', so the least significant 4-bits of its partial products are forced to zeros.

As shown in Table 3 below, the effect is that each subtree receives 1 element of the Operand A vector. In 8×8 Mode, the element size is 8-bits, so all of Operand A is used in the partial product calculations in each subtree. In 4×4 mode, the element size is 4-bits, so the top subtree receives the least significant element of operand A for its partial product calculations, and the bottom subtree receives the most significant element of operand A for its partial product calculations. This single hardware structure supports both modes, producing correct results for each mode of operation.

TABLE 3

| 8×8 Mode | | 4×4 Mode | |
|---|---|---|---|
| Operand A: 45 | 01000101 | Operand A: 45 | 01000101 |
| Operand B: ED | 11101101 | Operand B: ED | 11101101 |
| Mask1: 11111111 | 01000101 | Mask1: 00001111 | . . . 0101 |
|  | 00000000 |  | . . . 0000 |
|  | 01000101 |  | . . . 0101 |
|  | 01000101 |  | . . . 0101 |
| Mask0: 11111111 | 00000000 | Mask0: 11110000 | 0000 . . . |
|  | 01000101 |  | 0100 . . . |
|  | 01000101 |  | 0100 . . . |
|  | 01000101 |  | 0100 . . . |
| Result C | 011100000011001 | Result C | 011100000111001 |
| Hex | 3  8  1  9 | Hex | 3  8  3  9 |

Figure 13:
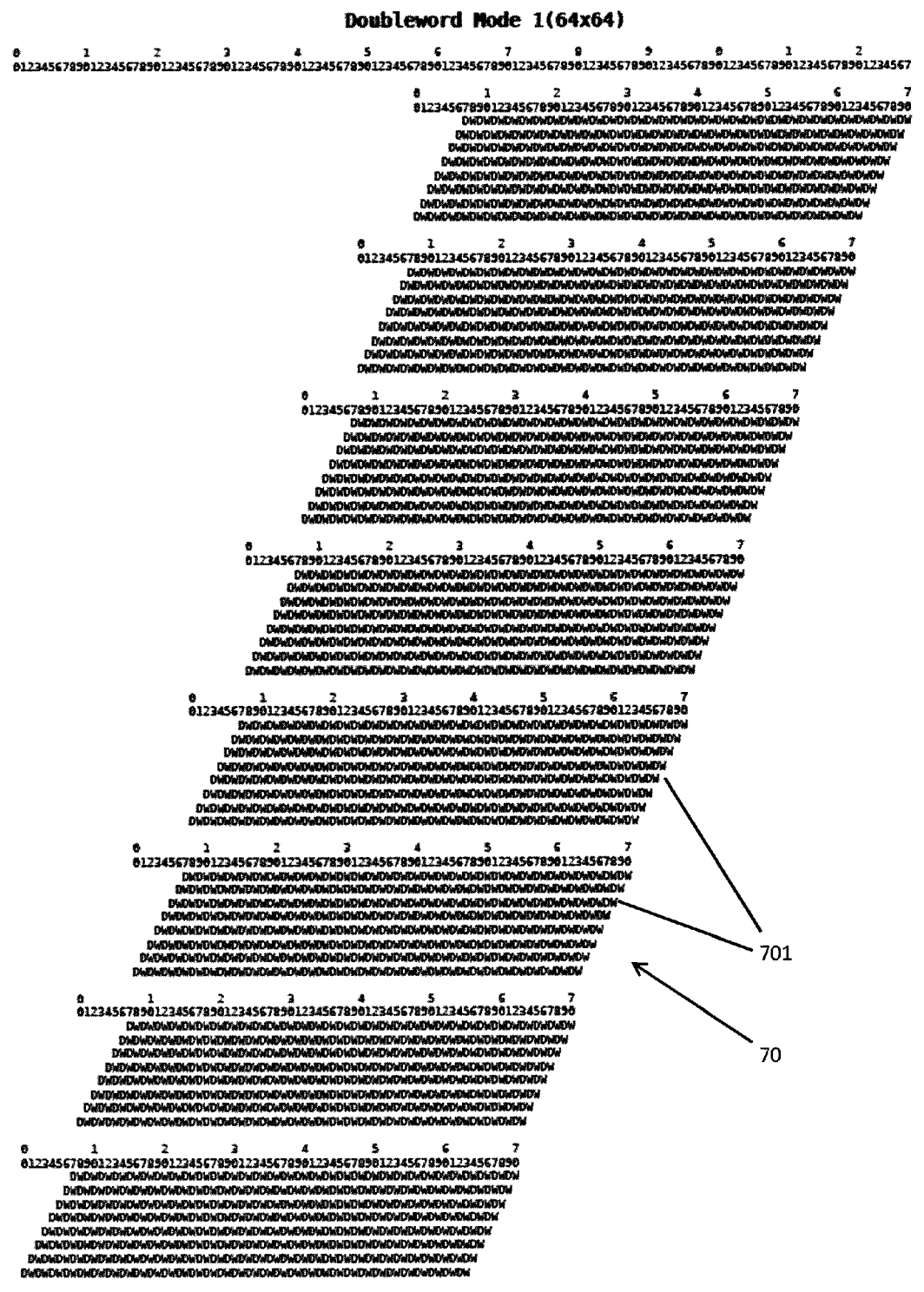
Figure 14:
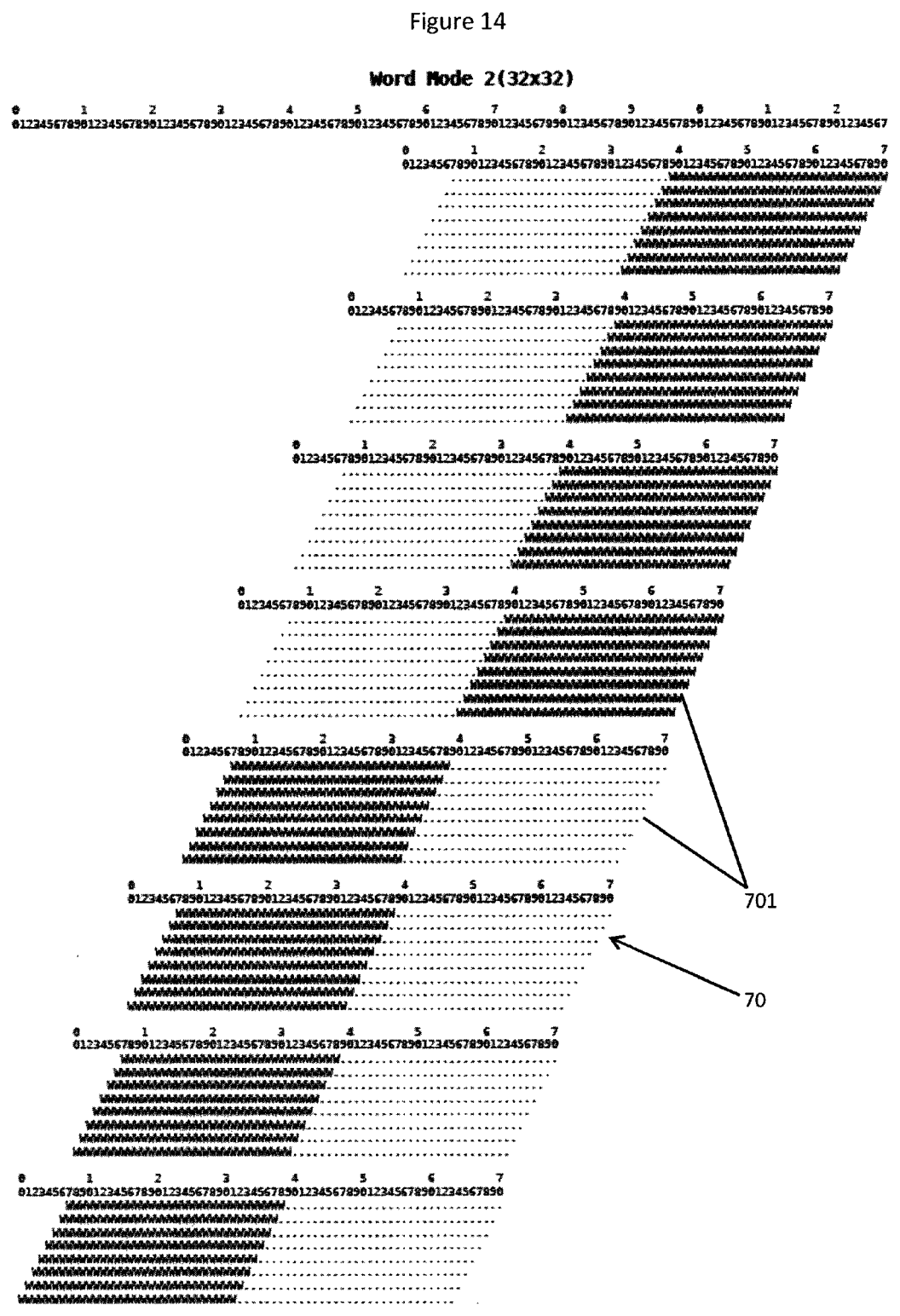
Figure 15:
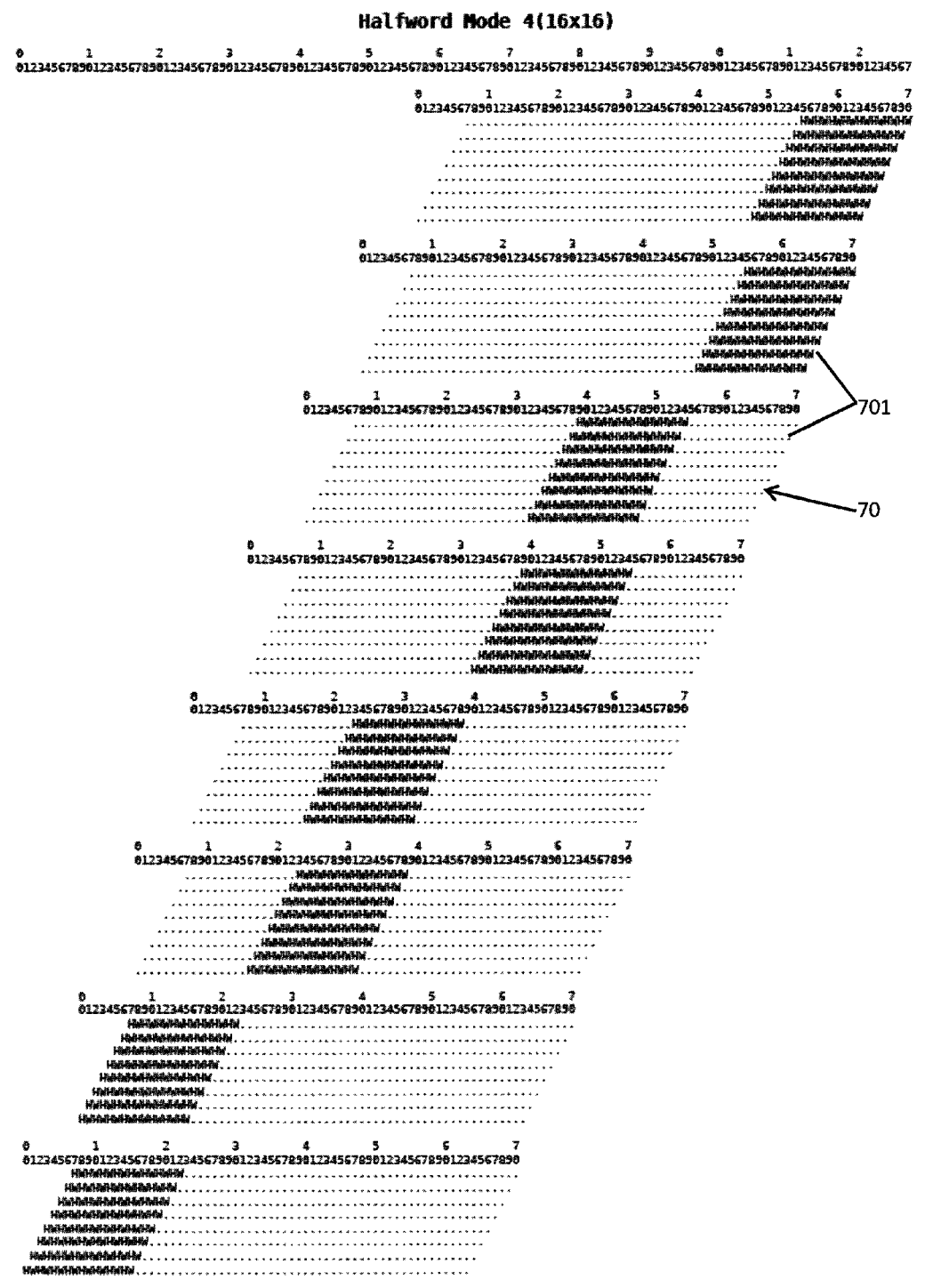
Figure 16:
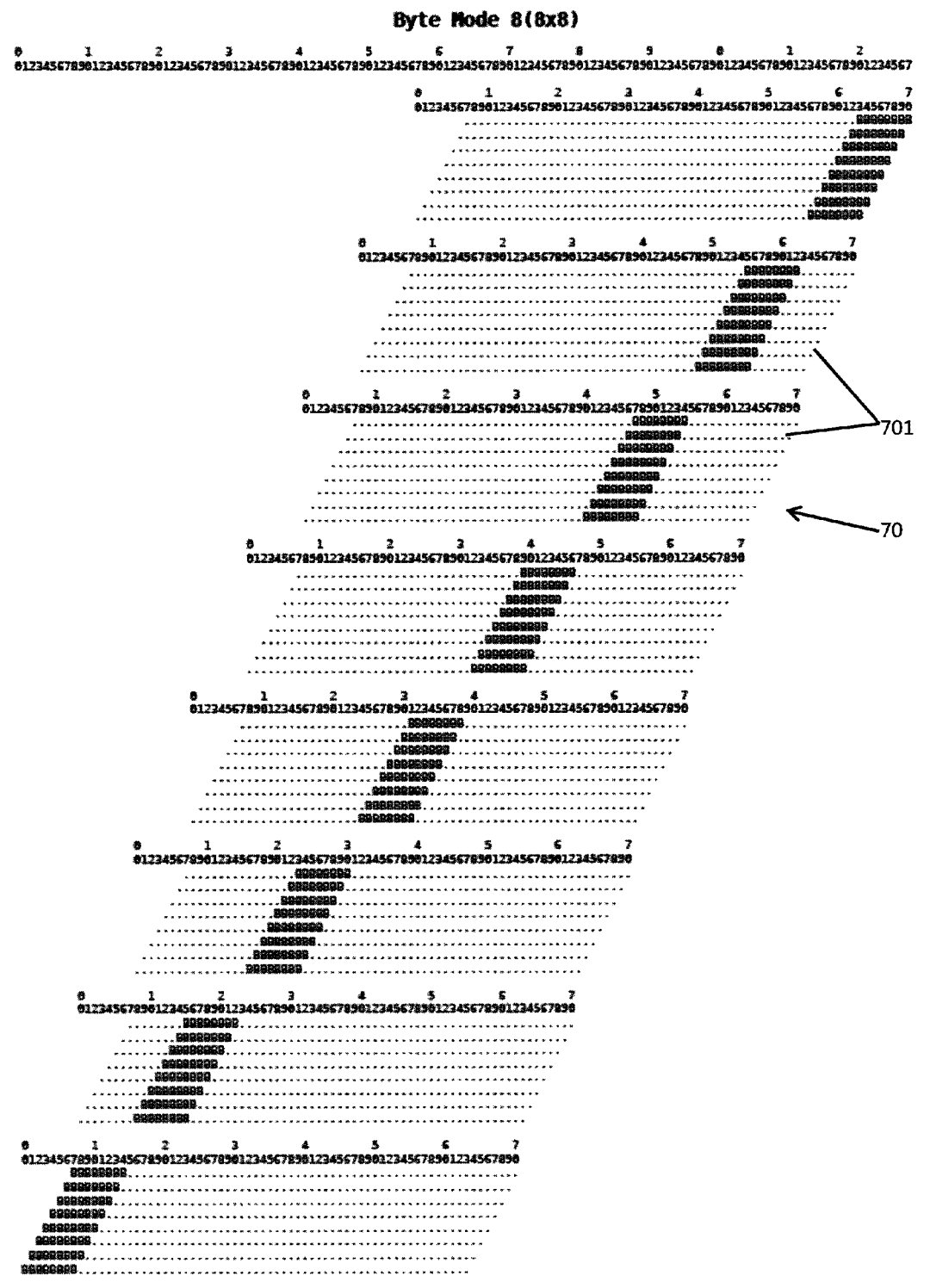

Turning now to the 64×64 hardware tree 70 of FIG. 13, which naturally handles Doubleword mode operation, the hardware tree 70 may be subdivided into the subtrees 701 to accommodate this and the other modes (i.e., Word mode of FIG. 14, the Halfword mode of FIG. 15 and the Byte mode of FIG. 16). In particular, according to the method, the hardware tree 70 is subdivided into subtrees 701 where the size of each subtree 701 is dictated by the Base mode such that each subtree 701 includes a number of partial products equal to the size of the elements in the Base mode. Thus, since there are 64 partial products in the hardware tree 70, in order to support the Byte mode, which is the Base mode and includes 8 independent 8×8 operations, the hardware tree 70 is subdivided into 8 subtrees 701, each of which is 8 partial products deep. Each subtree 701 produces a 71 bit result and are aligned with an 8 bit stagger with a single leading zero prepended to the full result. Each of these subtrees 701 receives a copy of operand A, modified by a mask value and an unmodified copy of operand B for forming its partial products.

Neither operand A nor operand B needs to be shifted onto the subtrees 701 for any mode and, therefore, no multiplexing of the inputs is required. Again, operand A is modified with the Bit Mask, which is based on element size and which may be expandable from a hard-coded byte mask that is previously created and latched. Each of the 8 subtrees 701 receives only one element of operand A.

Figure 9:
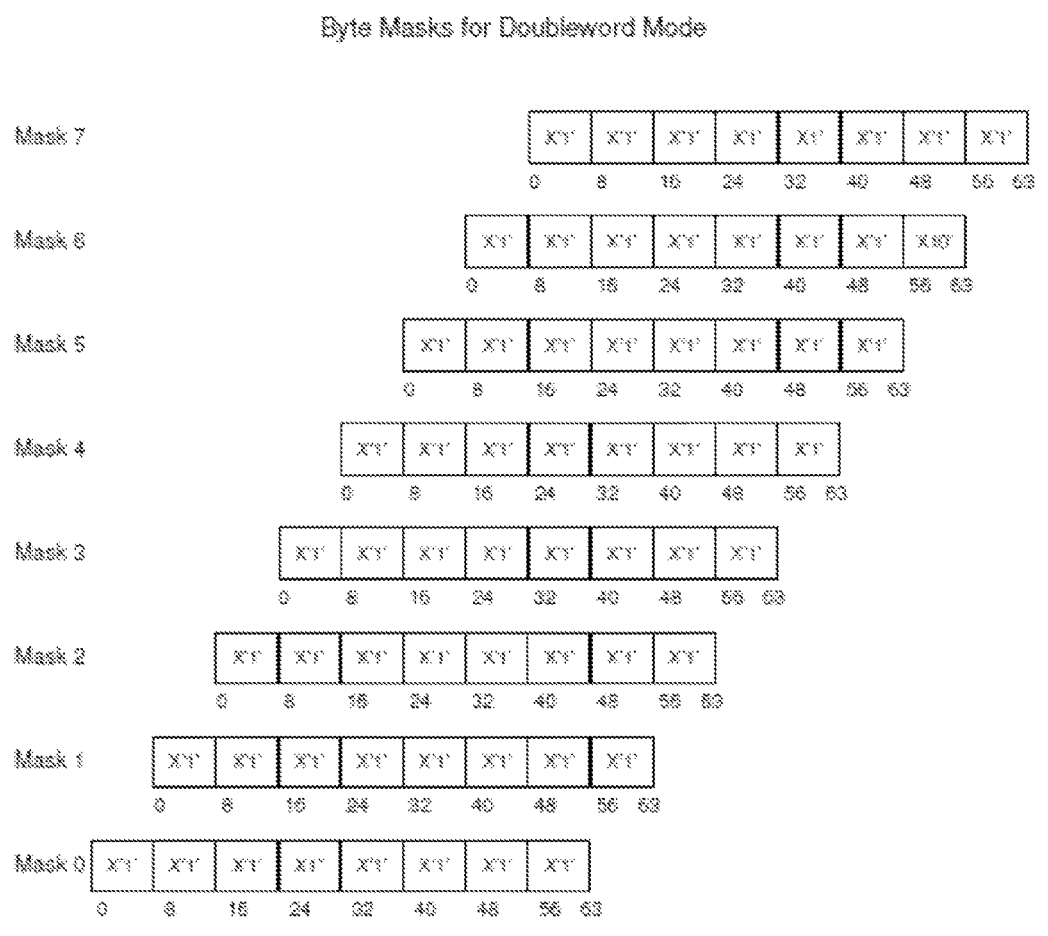
Figure 10:
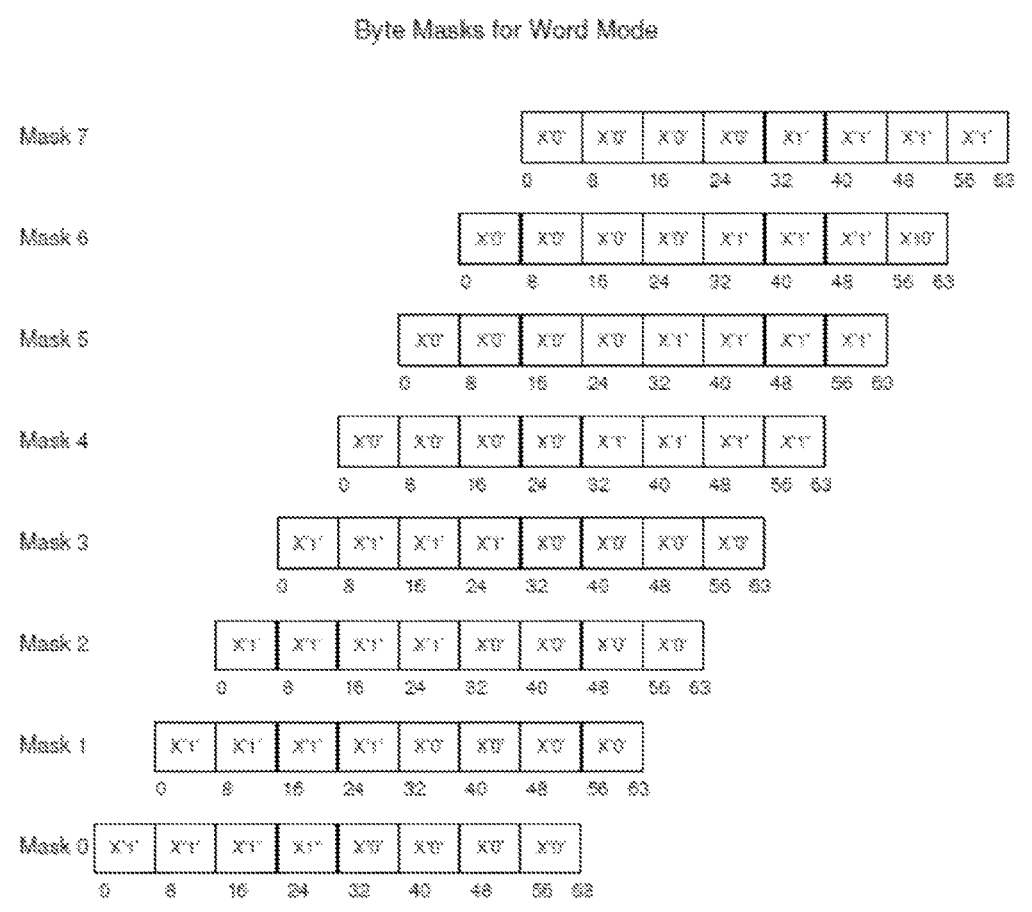
Figure 11:
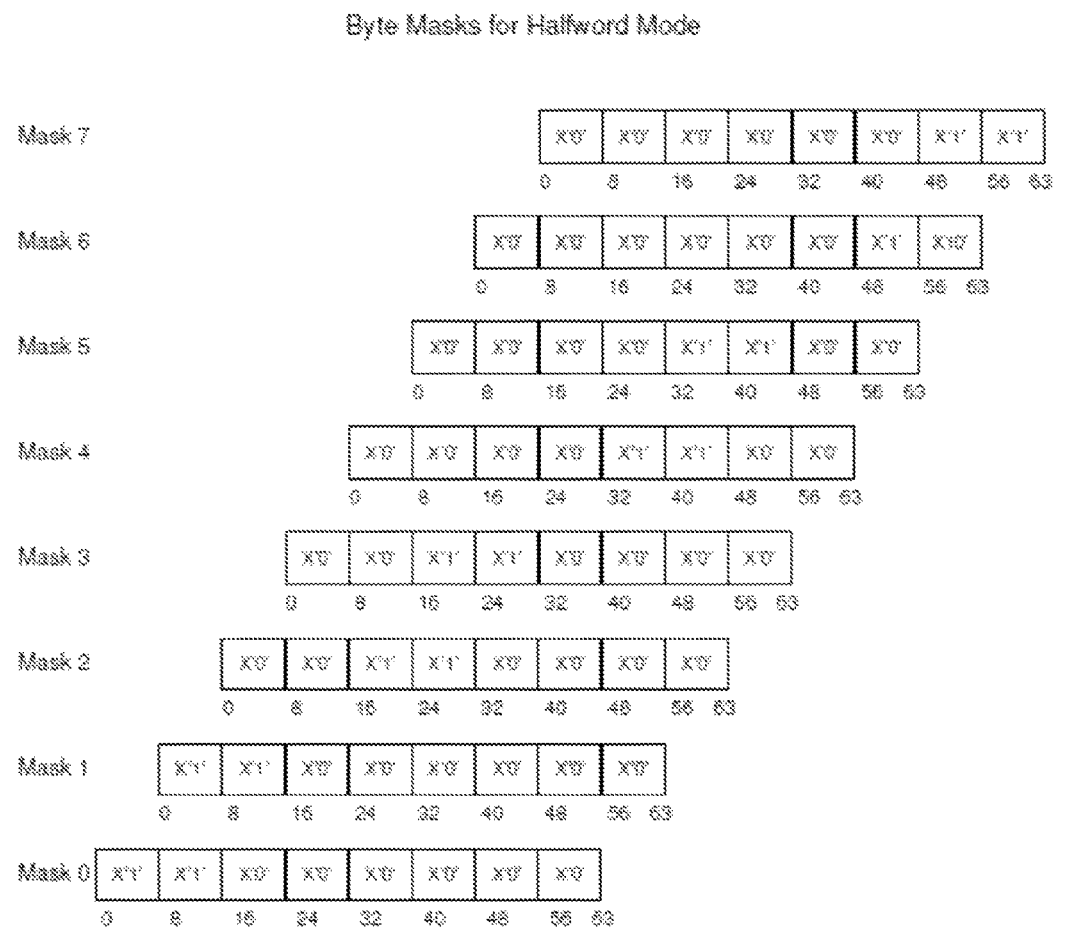
Figure 12:
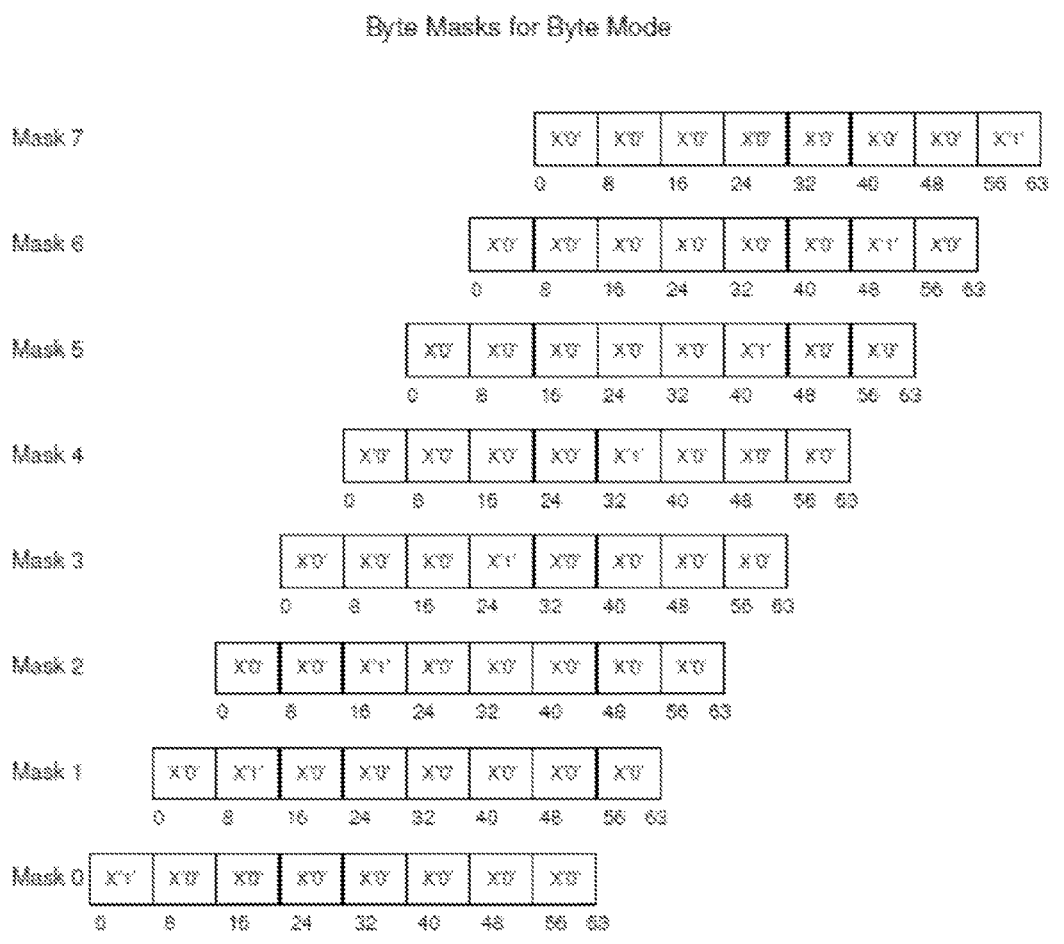

With reference to FIGS. 9-12 and, in accordance with embodiments, Byte masks for the various modes are illustrated. FIG. 9 shows the Byte masks for the Doubleword mode, which has 64-bit elements. All masks are filled with ones and each subtree 701 will receive the full 64 bits of Operand A. FIG. 10 shows the Byte masks for the Word mode. Each subtree will receive 4 bytes from Operand A with 32 zeros in the remaining bits. Likewise, FIG. 11 shows the Byte masks for the Halfword mode and, again, each subtree will receive 2 bytes from Operand A, with 48 zeros in the remaining bits. Finally, FIG. 12 shows the Byte masks for the Byte mode where each subtree 701 will receive 1 byte from Operand A with 56 zeros in the remaining bits.

FIGS. 13-16 illustrate how the hardware tree design accommodates the various element sizes of the Doubleword, Word, Halfword and Byte modes. Again, the "." character denotes bits of the partial products that are forced to zeros by the mask values for each mode. FIG. 13 depicts the Doubleword mode where each subtree 701 receives the single 64-bit element of Operand A and preserves all bits of the partial products. All 8 subtrees 701 participate in the single 64×64 operation. FIG. 14 illustrates the Word mode where the top 4 subtrees 701 receive the least significant 32-bit element of operand A and perform a 32×32 calculation. The bottom 4 subtrees 701 receive the most significant 32-bit element of Operand A and perform another, independent 32×32 calculation. FIG. 15 shows the Halfword mode operation where the 4 independent 16×16 calculations are performed by pairs of subtrees 701. FIG. 16 shows the Byte mode operation where each subtree 701 performs an independent 8×8 calculation.

A benefit of this solution is that, since the granularity only goes down to the byte level, not the bit level, only 8 8-bit Byte masks are needed, totaling 64 latches. The Bit masks can be expanded from the Byte Masks in combinatorial logic. Further, the Byte masks can be hard-coded and they do not rely on the operands. So, the Byte masks can be created in a previous cycle and latched, thereby reducing circuit loading of the operands. The cost for this solution is significantly less expensive than a solution using either multiplexing of the operands, multiple hardware trees, or some combination thereof. In this case, no operand multiplexing is done and only a single hardware tree 70 is needed.

Figure 17:
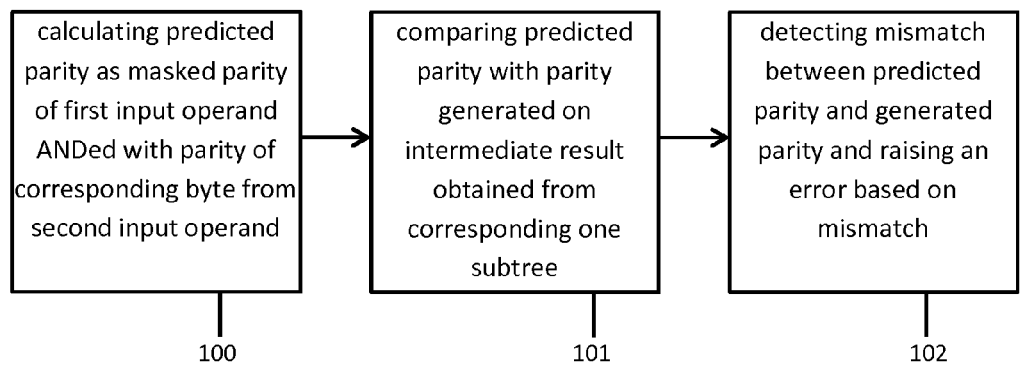
FIG. 17 is a flow diagram illustrating a method of error detection and fault tolerance in a scalar Galois field multiplier.

With reference to FIG. 17, a method of error detection and fault tolerance in a scalar Galois field multiplier is provided. As shown in FIG. 17, the method includes calculating a predicted parity as a masked parity of the first input operand ANDed with a parity of a corresponding byte from the second input operand (operation 100). The method further includes comparing the predicted parity with a parity generated on an intermediate result obtained from a corresponding one of the subtrees 701 (operation 101) and detecting a mismatch between the predicted parity and the generated parity and raising an error based on the mismatch (operation 102).

To expand upon the method of error detection described above and in FIG. 17, it is noted that certain fundamental principles in binary operations can be observed. In conjunction with the properties of a Galois Field Multiplier, the principles facilitate cost efficient error detection. The first principle is that any value XORed with a copy of itself produces a value of zero. Further, any value XORed with a copy of itself, which has been shifted by any amount, positive or negative, also produces a value of zero. Thus, for a Galois Field Multiplier, each partial product will either be a copy of Operand A or zeros and any even number of non-zero partial products will produce a parity of 0 for the result while an odd number of non-zero partial products will guarantee that the parity of the result matches the parity of Operand A as shown in Table 4 below.

TABLE 4

Let P(x) = Parity of x
For A gf B = C
Where ' gf ' is the Galois Field operation,
P(C) = P(A) AND P(B)

For the embodiment described above, there are 8 subtrees, each creating an intermediate result, which can be treated independently.

Considering the 8 subtrees, enumerated as x, where x ranges from 0 to 7, inclusive, each subtree may have an independent Bit Mask, as described above. There is one Bit Mask for each value of x. Likewise, each subtree utilizes one byte from Operand B. The bit range of Operand B, for each subtree is y, where y is defined as shown in Table 5 below.

TABLE 5 y = 56−x*8 to 63−x*8
It follows that:
P(subtree_result(x)) = P(A AND Bit Mask (x)) AND P(B(y))

In accordance with embodiments, Byte Parity on Operand A is generated. For each subtree, a logical AND is performed on the Byte Mask and Byte Parity. In parallel, parity on the byte of Operand B referenced by each subtree is generated. By performing a logical AND on these two values, the parity of the subtree intermediate results can be predicted. Parity can also be generated on the intermediate results and a mismatch between the prediction and the generated parity indicates an error. This error may be escalated to recovery logic.

Likewise, further predictions and comparisons are implemented as the intermediate results are combined. The final result is checked in a similar manner. The benefit of this solution is that increased coverage is possible by checking the intermediate results as well as the final result.

In accordance with further aspects, a method of error detection and fault tolerance in any Galois field multiplier, including a scalar case (non-vectorized) or the above-described vectorized case, is provided with a single error checking bit for the entire structure. For the scalar case, a large scalar example could be subdivided into subtrees to obtain better fault tolerance with an error checking bit for each subtree. Such subdivision need not result in a vectorized implementation, and the subdivision need not follow the above-described method for vectorizing the structure. That is, it need not be subdivided into equal sized subtrees.

In addition, the method may further include calculating a predicted parity as a parity first input operand ANDed with a parity of the second input operand, comparing the predicted parity with a parity generated on a final result of a Galois field multiplication of the first and second operands and raising an error based on a mismatch between the predicted parity and the generated parity. As an alternative, the method may include comparing the predicted parity with a parity generated on an intermediate result obtained from a corresponding one of the subtrees and raising an error based on a mismatch between the predicted parity and the generated parity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 18:
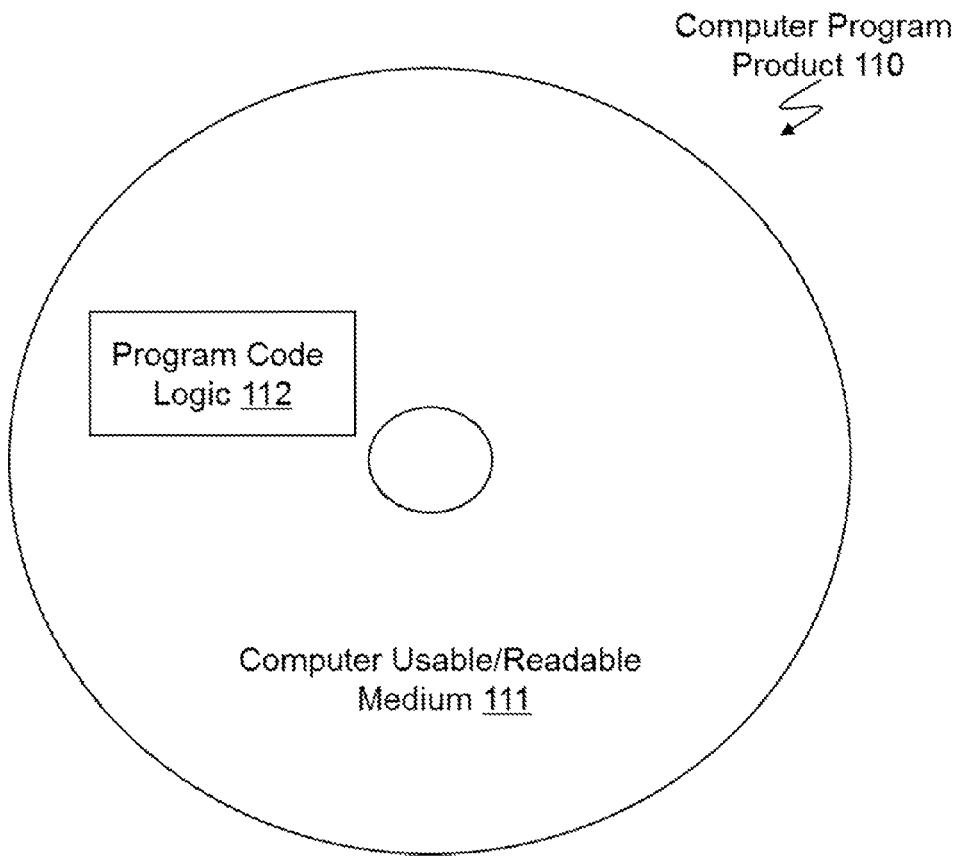
FIG. 18 depicts a computer-readable medium according to an embodiment.

Referring now to FIG. 18, in one example, a computer program product 110 includes, for instance, one or more storage media 111, wherein the media may be tangible and/or non-transitory, to store computer readable program code means or logic 112 thereon to provide and facilitate one or more aspects of embodiments described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for executing vectorized Galois field multiplication, the system comprising:
 a memory; and
 a processor, communicatively coupled to said memory, the computer system configured to perform a method comprising:
 inputting, by the processor, first and second input operands of equal sizes into a single hardware tree comprising AND gates for partial products where adjacent bit elements for adjacent partial products are respectively generated from a first AND gate having input provided from first bit elements of the first and second input operands, and a second AND gate having input provided from the first bit element of the first input operand and a second bit element of the second input operand;
 calculating a predicted parity as a parity of the first input operand ANDed with a parity of the second input operand;
 comparing the predicted parity with a parity generated on a final result of a Galois field multiplication of the first and second operands; and
 raising an error based on a mismatch between the predicted parity and the generated parity.

2. The computer system according to claim 1, wherein the first and second input operands are each divisible into vectorized elements.

3. The computer system according to claim 2, wherein a base mode of the vectorized elements has a smallest element size being a factor of a size of the first and second input operands.

4. The computer system according to claim 3, wherein each higher mode has an element size that is a multiple of the base element size.

5. The computer system according to claim 1, wherein the single hardware tree is divisible into sub-trees.

6. A computer implemented method for vectorized Galois field multiplication, the method comprising:
 inputting first and second input operands of equal sizes into a single hardware tree comprising AND gates for partial products where adjacent bit elements for adjacent partial products are respectively generated from a first AND gate having input provided from first bit elements of the first and second input operands, and a second AND gate having input provided from the first bit element of the first input operand and a second bit element of the second input operand;
 calculating a predicted parity as a parity of the first input operand ANDed with a parity of the second input operand;
 comparing the predicted parity with a parity generated on a final result of a Galois field multiplication of the first and second operands; and
 raising an error based on a mismatch between the predicted parity and the generated parity.

7. The computer implemented method according to claim 6, wherein further comprising dividing each of first and second input operands into vectorized elements.

8. The computer implemented method according to claim 7, wherein a base mode of the vectorized elements has a smallest element size being a factor of a size of the first and second input operands.

9. The computer implemented method according to claim 8, wherein each higher mode has an element size that is a multiple of the base element size.

10. The computer implemented method according to claim 6, wherein the single hardware tree is divisible into sub-trees.

11. A computer program product for implementing a vectorized Galois field multiplication, the computer program product comprising:
 a computer readable storage medium having program instructions embodied therewith, wherein the computer readable storage medium is not a signal, the program instructions readable by a processing circuit to cause the processing circuit to perform a method comprising:
 inputting, by the processing circuit, first and second input operands of equal sizes into a single hardware tree comprising AND gates for partial products where adjacent bit elements for adjacent partial products are respectively generated from a first AND gate having input provided from first bit elements of the first and second input operands, and a second AND gate having input provided from the first bit element of the first input operand and a second bit element of the second input operand;
 calculating a predicted parity as a parity of the first input operand ANDed with a parity of the second input operand;
 comparing the predicted parity with a parity generated on a final result of a Galois field multiplication of the first and second operands; and
 raising an error based on a mismatch between the predicted parity and the generated parity.

12. The computer program product according to claim 11, wherein the first and second input operands are each divisible into vectorized elements.

13. The computer program product according to claim 12, wherein a base mode of the vectorized elements has a smallest element size being a factor of a size of the first and second input operands.

14. The computer program product according to claim 13, wherein each higher mode has an element size that is a multiple of the base element size.

15. The computer program product according to claim 11, wherein the single hardware tree is divisible into sub-trees.

* * * * *